(12) United States Patent
Onishi et al.

(10) Patent No.: US 12,113,389 B2
(45) Date of Patent: Oct. 8, 2024

(54) CONTROL DEVICE OR CONTROL METHOD

(71) Applicant: TOYOTA JIDOSHA KABUSHIKI KAISHA, Toyota (JP)

(72) Inventors: Kenta Onishi, Kariya (JP); Yoshiaki Kikuchi, Toyota (JP); Yoshihiro Uchida, Nagakute (JP); Yuki Sugo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

(21) Appl. No.: 18/108,181

(22) Filed: Feb. 10, 2023

(65) Prior Publication Data

US 2023/0336016 A1   Oct. 19, 2023

(30) Foreign Application Priority Data

Apr. 15, 2022   (JP) ................ 2022-067643

(51) Int. Cl.
*H02J 7/00* (2006.01)
*B60L 50/60* (2019.01)
(52) U.S. Cl.
CPC ........ *H02J 7/00712* (2020.01); *H02J 7/0048* (2020.01); *H02J 7/005* (2020.01); *B60L 50/60* (2019.02); *H02J 7/0013* (2013.01); *H02J 2207/20* (2020.01)

(58) Field of Classification Search
CPC ...... H02J 7/00712; H02J 7/0048; H02J 7/005; H02J 2207/20; H02J 7/0013; B60L 50/60
See application file for complete search history.

(56) References Cited

U.S. PATENT DOCUMENTS

| | | | |
|---|---|---|---|
| 8,712,619 B2* | 4/2014 | Kusumi | B60L 58/16 180/2.2 |
| 11,571,971 B2* | 2/2023 | Homma | B60L 55/00 |
| 2012/0283903 A1 | 11/2012 | Kusumi et al. | |
| 2013/0293200 A1* | 11/2013 | Obata | H01M 10/44 320/134 |
| 2014/0097676 A1 | 4/2014 | Kusumi | |
| 2022/0407339 A1* | 12/2022 | Kobayashi | H02J 7/007182 |

FOREIGN PATENT DOCUMENTS

JP   5772952 B2   9/2015
WO   2011/061810 A1   5/2011

* cited by examiner

*Primary Examiner* — Carlos Amaya
(74) *Attorney, Agent, or Firm* — Dinsmore & Shohl LLP

(57) ABSTRACT

The control device includes an acquisition unit that acquires a first index value that is an index of a deterioration state of the power storage device, and a lower limit setting unit that lowers a lower limit value of an allowable range for a second index value indicating a power storage state of the power storage device, when the first index value acquired by the acquisition unit indicates a predetermined degree of deterioration or more.

10 Claims, 5 Drawing Sheets

FIG. 4
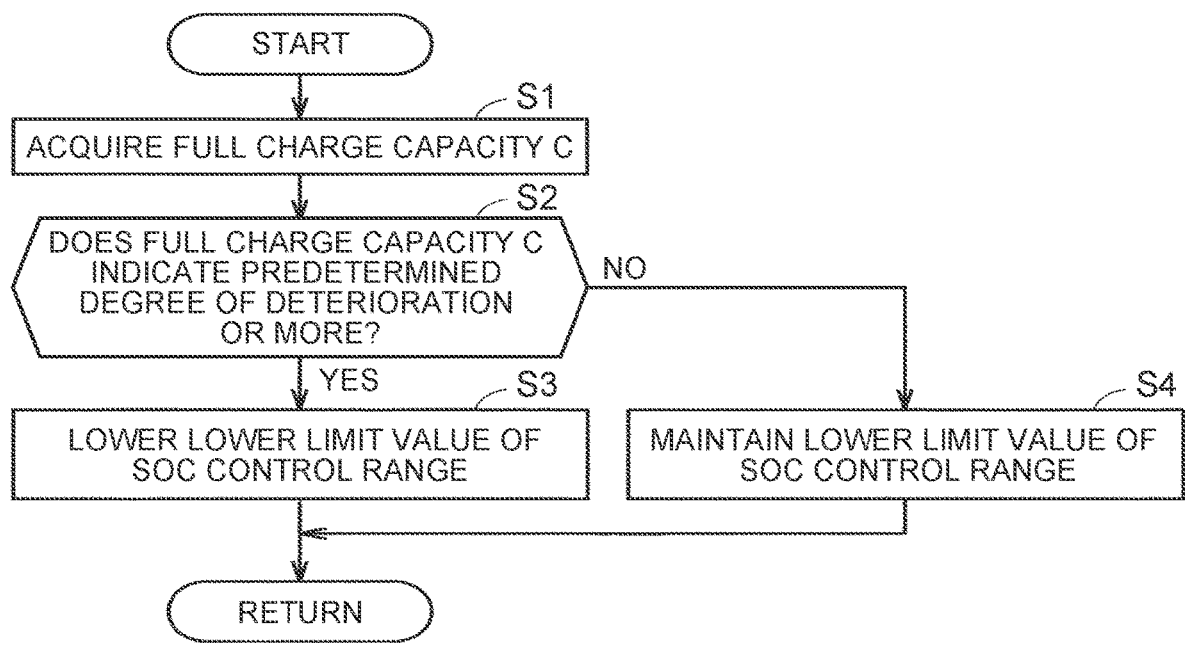
FIG. 5
| FULL CHARGE CAPACITY C | 100% | 80% | 60% | 40% |
|---|---|---|---|---|
| LOWER LIMIT VALUE OF SOC CONTROL RANGE | 40% | 30% | 20% | 10% |
FIG. 6
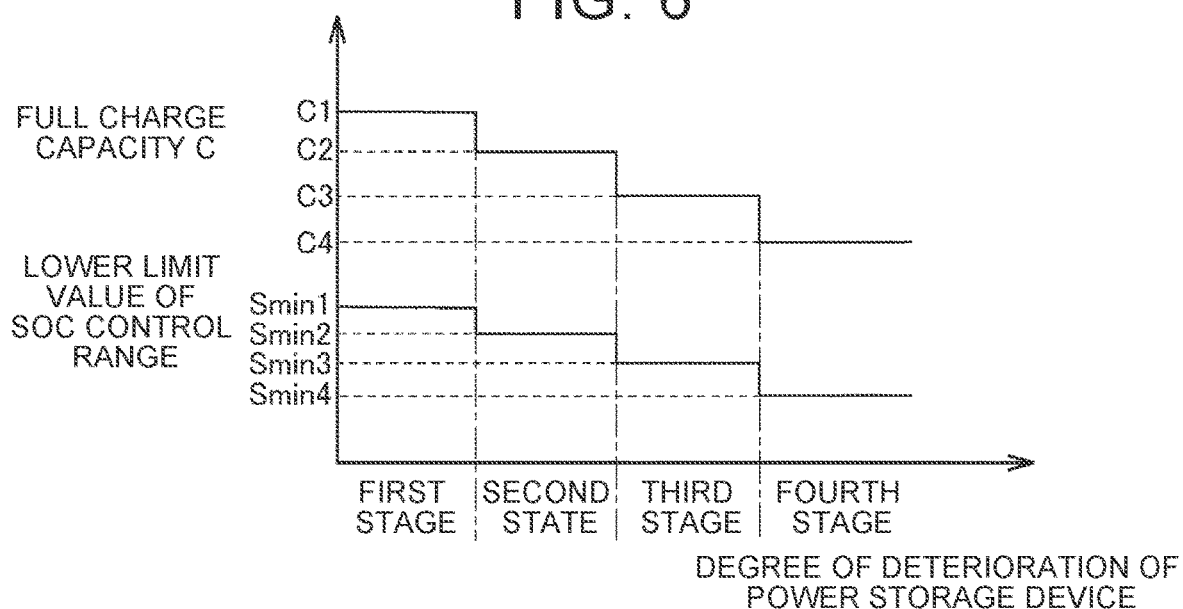

CONTROL DEVICE OR CONTROL METHOD

CROSS-REFERENCE TO RELATED APPLICATION

This application claims priority to Japanese Patent Application No. 2022-067643 filed on Apr. 15, 2022, incorporated herein by reference in its entirety.

BACKGROUND

1. Technical Field

The present disclosure relates to a control device or a control method for a power storage device mounted on a vehicle.

2. Description of Related Art

A conventional power storage device uses a ternary system battery in which a positive electrode material containing nickel, manganese, and cobalt as main components is used. In the state of charge (SOC)-open circuit voltage (OCV) characteristic curve of a ternary battery, OCV with respect to SOC is substantially linear. Therefore, in any SOC band, the ratio of the amount of increase in OCV with respect to the amount of increase in SOC is large, and is, for example, about 10 mV/%.

In such a case, for example, as described in WO 2011/061810, the SOC control range is set in advance so as to have a margin with respect to the full charge capacity of the power storage device. When it is determined that deterioration of the power storage device has been established, the upper limit of the SOC control range is increased by changing the voltage. In this way, by changing the voltage as the power storage device deteriorates and raising the upper limit of the storage amount, it is possible to ensure the cruising distance even when the power storage device deteriorates.

SUMMARY

However, depending on the power storage device, the ratio of the amount of increase in the OCV with respect to the amount of increase in the SOC in the SOC-OCV characteristic curve may be very small, making it difficult to greatly change the upper limit of the SOC control range. In addition, depending on the power storage device, in the SOC-OCV characteristic curve, the OCV may fluctuate greatly due to the deterioration state of the power storage device on the high SOC region side, making it difficult to raise the upper limit of the SOC control range. In such situations, if no countermeasures can be taken, the capacity that can be used by the power storage device cannot be substantially increased when the power storage device deteriorates, making it difficult to ensure a sufficient cruising distance.

The present disclosure has been made in view of the above-described issues, and an object of the present disclosure is to provide a control device and a control method capable of securing a sufficient cruising distance even when it is difficult to raise the upper limit of the allowable range of an index value that indicates the power storage state of a power storage device.

A control device based on the present disclosure is a control device that controls a power storage device. The control device includes: an acquisition unit that acquires a first index value that is an index of a deterioration state of the power storage device; and a lower limit setting unit that lowers a lower limit value of an allowable range for a second index value indicating a power storage state of the power storage device, when the first index value acquired by the acquisition unit indicates a predetermined degree of deterioration or more.

According to the above configuration, it is possible to lower the lower limit value of the allowable range for the second index value indicating the power storage state of the power storage device at the timing when the first index value indicates the predetermined degree of deterioration or more. Accordingly, the capacity that can be used by the power storage device can be increased compared to the case where the lower limit value is not lowered. As a result, even when it is difficult to increase the upper limit value of the allowable range in the power storage device, a sufficient cruising distance can be ensured.

In the control device based on the present disclosure, the power storage device may have an SOC-OCV characteristic curve including a first SOC region in which SOC is equal to or higher than a predetermined reference value and a second SOC region in which the SOC is less than the reference value. In this case, the SOC-OCV characteristic curve of the power storage device before deterioration in which the first index value does not indicate the predetermined degree of deterioration or more may be different from the SOC-OCV characteristic curve of the power storage device after deterioration in which the first index value indicates the predetermined degree of deterioration or more. Furthermore, in this case, an amount of change in OCV of the power storage device before and after deterioration in the high SOC region may be greater than the amount of change in the OCV before and after deterioration in the low SOC region.

According to the above configuration, when using the power storage device as described above, it is possible to effectively secure a sufficient cruising distance by lowering the lower limit value of the allowable range for the second index value.

In the control device based on the present disclosure, the power storage device may have an SOC-OCV characteristic curve including a first SOC region in which SOC is equal to or higher than a predetermined reference value and a second SOC region in which the SOC is less than the reference value. In this case, after the power storage device is charged such that the SOC becomes equal to or higher than the reference value and discharge is performed, until a predetermined time elapses from a timing at which discharge is suspended, a voltage of the power storage device may not return to the voltage at a start of discharge.

According to the above configuration, when using the power storage device as described above, it is possible to effectively secure a sufficient cruising distance by lowering the lower limit value of the allowable range for the second index value.

In the control device based on the present disclosure, the power storage device may have an SOC-OCV characteristic including a flat region in which a change rate of an open circuit voltage with respect to a state of charge is equal to or less than a predetermined value.

According to the above configuration, when using the power storage device as described above, it is possible to effectively secure a sufficient cruising distance by lowering the lower limit value of the allowable range for the second index value.

In the control device based on some embodiments of the present disclosure, the lower limit setting unit maintains the lower limit value when the first index value does not indicate the predetermined degree of deterioration or more.

According to the above configuration, the lower limit value can be maintained until the first index value indicates a predetermined degree of deterioration or more, so that the lower limit value can be easily managed.

In the control device based on some embodiments of the present disclosure, the lower limit setting unit lowers the lower limit value as the degree of deterioration increases.

According to the above configuration, the lower limit value can be lowered each time the degree of deterioration of the power storage device progresses to a predetermined stage. As a result, it is possible to increase the capacity that can be used by the power storage device at each stage of progress of deterioration.

In the control device based on the present disclosure, the first index value may be a full charge capacity of the power storage device.

According to the above configuration, the deterioration state of the power storage device can be determined based on the full charge capacity.

In the control device based on the present disclosure, the second index value may be a state of charge SOC of the power storage device or a voltage of the power storage device.

According to the above configuration, the power storage state of the power storage device can be managed based on the SOC of the power storage device or the voltage of the power storage device.

A control method based on the present disclosure is a control method for controlling the power storage device having an SOC-OCV characteristic including a flat region in which a change rate of an open circuit voltage with respect to a storage amount is equal to or less than a predetermined value. The control method includes: acquiring a first index value that is an index of a deterioration state of the power storage device; and lowering a lower limit value of an allowable range for a second index value indicating a power storage state of the power storage device, when the acquired first index value indicates a predetermined degree of deterioration or more.

According to the above configuration, it is possible to lower the lower limit value of the allowable range for the second index value indicating the power storage state of the power storage device at the timing when the first index value indicates the predetermined degree of deterioration or more. Accordingly, the capacity that can be used by the power storage device can be increased compared to the case where the lower limit value is not lowered. As a result, even when the power storage device has a SOC-OCV characteristic curve including a flat region in which the change rate of the open circuit voltage with respect to the storage amount is equal to or less than a predetermined value, a sufficient cruising distance can be ensured.

In some embodiments, the control method based on the present disclosure includes maintaining the lower limit value when the first index value does not indicate the predetermined degree of deterioration or more.

According to the above configuration, the lower limit value can be maintained until the first index value indicates a predetermined degree of deterioration or more, so that the lower limit value can be easily managed.

The present disclosure can provide a control device and a control method capable of securing a sufficient cruising distance even when it is difficult to raise the upper limit of the allowable range of an index value that indicates the power storage state of a power storage device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram showing a flowchart showing a control flow for setting a lower limit value by a lower limit setting unit shown in FIG. 1;

FIG. 5 is a diagram showing an example of the relationship between a full charge capacity and the lower limit value of an SOC control range in the control flow shown in FIG. 4;

FIG. 6 is a diagram illustrating control of the lower limit value of the SOC control range according to the degree of deterioration of the main battery according to the embodiment;

DETAILED DESCRIPTION OF EMBODIMENTS

Figure 1:
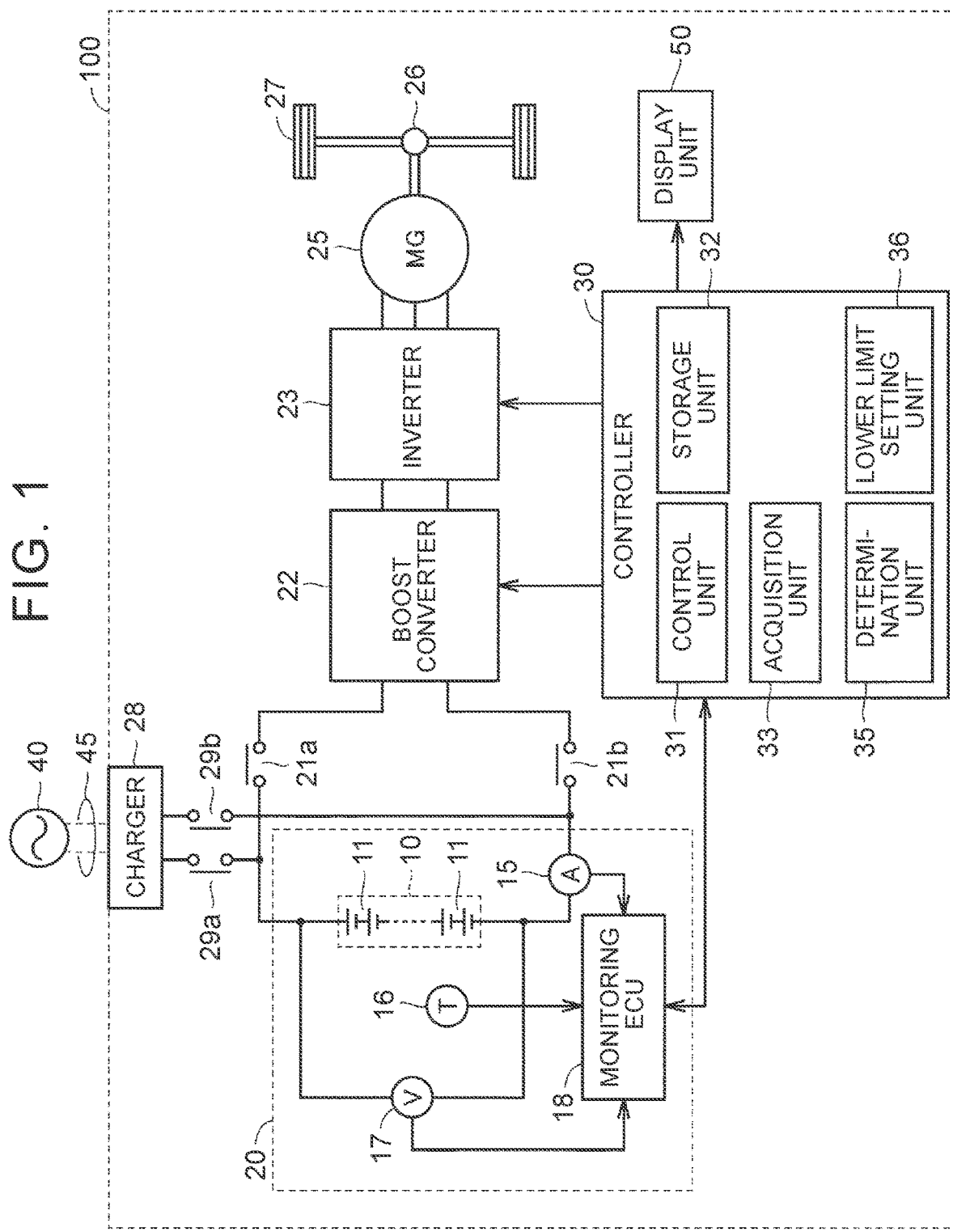
FIG. 1 is a block diagram showing a configuration of an electrified vehicle according to an embodiment.

Hereinafter, an embodiment of the present disclosure will be described in detail with reference to the drawings. In the embodiment shown below, the same or common parts are denoted by the same reference signs in the drawings, and the description thereof will not be repeated.

FIG. 1 is a block diagram showing a configuration of an electrified vehicle 100 according to the present embodiment. In the present embodiment, an example in which the electrified vehicle 100 is a battery electric vehicle will be described, but the electrified vehicle 100 is not limited to being a battery electric vehicle, and may be, for example, a plug-in hybrid electric vehicle, a hybrid electric vehicle, or a fuel cell electric vehicle.

Referring to FIG. 1, the electrified vehicle 100 includes a battery pack 20, a boost converter 22, an inverter 23, a motor generator 25, a transmission gear 26, drive wheels 27, a controller 30, and a display unit 50.

The battery pack 20 is mounted on the electrified vehicle 100 as a driving power source (i.e., a power source) of the electrified vehicle 100. The battery pack 20 is composed of a main battery (power storage device) 10 including a plurality of power storage stacks 11. Each storage stack 11 is composed of a rechargeable storage cell. The storage cell is composed of a rechargeable iron phosphate-based lithium-ion battery (LFP battery), for example.

Figure 2:
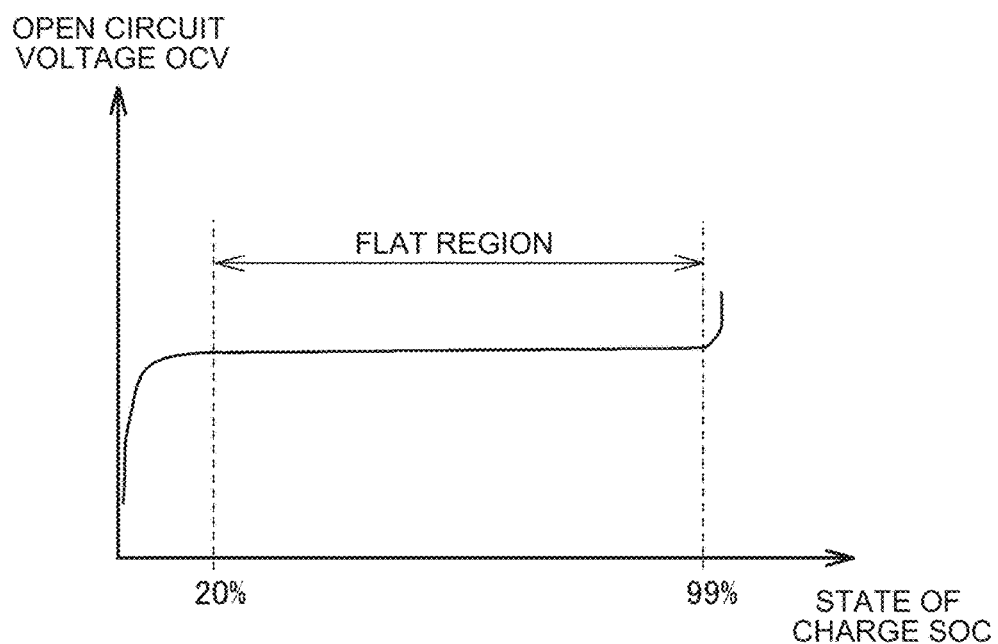
FIG. 2 is a diagram showing an example of state of charge (SOC)-open circuit voltage (OCV) characteristics of a main battery according to the embodiment.

FIG. 2 is a diagram showing an example of state of charge (SOC)-open circuit voltage (OCV) characteristics of the main battery 10 according to the embodiment. As described above, when an LFP battery is adopted as a storage cell, as shown in FIG. 2, the SOC-OCV characteristic has a flat region in which the change rate of the OCV with respect to the SOC is less than adjacent regions. The SOC is a percentage of the current storage amount with respect to the full charge capacity of the main battery 10.

In the SOC-OCV characteristics, the flat region is provided in the range of SOC from about 20% to about 99%. In the flat region, the change rate is about 0.2 mV/%.

In general, when a so-called ternary system battery is used as the main battery and the SOC-OCV characteristic is approximately linear, the ratio of the amount of increase in the OCV with respect to the amount of increase in the SOC is large in any SOC band. Therefore, when it is determined that deterioration of the power storage device has been established, the upper limit of the SOC control range is increased by changing the voltage, to increase the cruising distance.

On the other hand, in the present embodiment, when the flat region occupies most of the SOC-OCV characteristic as described above, the range in which the SOC can be changed by changing the voltage is the ranges where the SOC is greater than approximately 99% and smaller than approximately 20%.

In the range where the SOC is greater than approximately 99%, the SOC range is only about 1%, so the variable range is small, and it is considered practically ineffective to increase the cruising distance by changing the upper limit value of the SOC control range in such a range. Although the voltage changes even in the range where the SOC is less than approximately 20%, it is also considered ineffective to set the upper limit value of the SOC control range to less than approximately 20%.

Under such circumstances, in the present embodiment, even when the main battery 10 has an SOC-OCV characteristic curve having the above-described flat region, when the main battery 10 deteriorates, the capacity that can be used by the main battery 10 can be effectively increased with the control described later by controller 30, and a sufficient cruising distance can be ensured.

As shown again in FIG. 1, the battery pack 20 further includes a current sensor 15, a temperature sensor 16, a voltage sensor 17, and a battery monitoring unit 18. The battery monitoring unit 18 is constituted by, for example, an electronic control unit (ECU). Hereinafter, the battery monitoring unit 18 is also referred to as "monitoring ECU 18".

The current sensor 15 detects the input/output current of the main battery 10 (hereinafter also referred to as "battery current Ib (see FIG. 3)"). Hereinafter, with respect to the battery current Ib, the discharge current is represented as a positive value, and the charge current is represented as a negative value.

The temperature sensor 16 detects the temperature of the main battery 10 (hereinafter also referred to as "battery temperature Tb (see FIG. 3)"). Note that multiple temperature sensors 16 may be disposed. In this case, the weighted average value, the maximum value, or the minimum value of the temperatures detected by the multiple temperature sensors 16 can be used as the battery temperature Tb, or the temperature detected by a specific temperature sensor 16 can be used as the battery temperature Tb. The voltage sensor 17 detects the output voltage of the main battery 10 (hereinafter also referred to as "battery voltage Vb (see FIG. 3)").

The monitoring ECU 18 receives the detected values of the current sensor 15, the temperature sensor 16, and the voltage sensor 17. The monitoring ECU 18 outputs the battery voltage Vb, the battery current Ib, and the battery temperature Tb to the controller 30. Alternatively, the monitoring ECU 18 can store data of the battery voltage Vb, the battery current Ib, and the battery temperature Tb in a built-in memory (not shown).

Further, the monitoring ECU 18 may have a function of calculating the SOC of the main battery 10 using at least one of the battery voltage Vb, the battery current Ib, and the battery temperature Tb. The calculation function of the SOC can also be provided in the controller 30 to be described later. In this case, an estimation unit for calculating the SOC is provided in the controller 30.

In the following description, data related to the main battery 10 such as the battery voltage Vb, the battery current Ib, the battery temperature Tb, and the SOC is collectively referred to as "measurement data".

The main battery 10 is connected to the boost converter 22 via system main relays 21a, 21b. The boost converter 22 boosts the output voltage of the main battery 10. The boost converter 22 is connected to the inverter 23, and the inverter 23 converts direct-current (DC) power from the boost converter 22 to alternating-current (AC) power.

The motor generator (three-phase AC motor) 25 generates kinetic energy for causing the electrified vehicle 100 to travel by receiving the AC power from the inverter 23. The kinetic energy generated by the motor generator 25 is transmitted to the drive wheels 27. On the other hand, when decelerating the electrified vehicle 100 or stopping the electrified vehicle 100, the motor generator 25 converts the kinetic energy of the electrified vehicle 100 into electric energy. The AC power generated by the motor generator 25 is converted to DC power by the inverter 23 and supplied to the main battery 10 through the boost converter 22. Regenerative power can thus be stored in the main battery 10. In this way, the motor generator 25 is configured to generate a driving force or a braking force of the vehicle with the transfer of electric power to and from the main battery 10 (that is, charging/discharging of the main battery 10).

Note that the boost converter 22 can be omitted. Further, when using a DC motor as the motor generator 25, the inverter 23 can be omitted.

When the electrified vehicle 100 is configured as a hybrid electric vehicle further equipped with an engine (not shown) as a power source, the output of the engine can be used as a driving force for traveling in addition to the output of the motor generator 25. Alternatively, when the vehicle is further equipped with a motor generator that generates electric power with the output of the engine, charging power of the main battery 10 can also be generated with the output of the engine.

The controller 30 is constituted by, for example, an ECU, and includes a control unit 31, a storage unit 32, an acquisition unit 33, a determination unit 35, and a lower limit setting unit 36. The control unit 31 controls the operation of various devices such as the boost converter 22 and the inverter 23.

Programs and various data for operating the control unit 31 are stored in the storage unit 32. The storage unit 32 can be provided outside the controller 30, and data can be read and written in the storage unit 32 by the control unit 31. The acquisition unit 33, the determination unit 35, and the lower limit setting unit 36 will be described later with reference to FIG. 3.

The controller 30 controls operations of the system main relays 21a, 21b, the boost converter 22, and the inverter 23. When the start switch (not shown) is switched from off to on, the controller 30 switches the system main relays 21a, 21b from off to on, or operates the boost converter 22 and the inverter 23. When the start switch is switched from on to off, the controller 30 switches the system main relays 21a, 21b from on to off, or stops the operation of the boost converter 22 and the inverter 23.

The display unit 50 is configured to display predetermined information to the user of the electrified vehicle 100 in response to a control command from the controller 30. The display unit 50, for example, may be constituted by a touch panel display or the like using a liquid crystal panel.

The electrified vehicle 100 is configured to include an external charging function for charging the main battery 10 by an external power source 40. The electrified vehicle 100 further includes a charger 28 and charging relays 29a, 29b. In the following, charging of the main battery 10 using the external power source 40 is also referred to as "external charging".

The external power source 40 is a power source provided outside the vehicle, and, for example, a commercial AC power source can be applied as the external power source 40. The charger 28 converts electric power from the external power source 40 to the charging power of the main battery 10. The charger 28 is connected to the main battery 10 via the charging relays 29a, 29b. When the charging relays 29a, 29b are turned on, the main battery 10 can be charged by electric power from the external power source 40.

The external power source 40 and the charger 28 can be connected, for example, by charging cables 45. That is, when the charging cables 45 are mounted, the external power source 40 and the charger 28 are electrically connected, which makes it possible to charge the main battery 10 using the external power source 40. Alternatively, the electrified vehicle 100 may be configured such that electric power is transmitted in a non-contact manner between the external power source 40 and the charger 28. For example, the main battery 10 can be charged by the external power source 40 by transmitting electric power via a power transmitting coil (not shown) on the external power source side and a power receiving coil (not shown) on the electrified vehicle side.

Accordingly, when AC power is supplied from the external power source 40, the charger 28 is configured to have a function of converting the electric power supplied from the external power source 40 (AC power) to the charging power of the main battery 10 (DC power). Alternatively, when the external power source 40 directly supplies charging power for the main battery 10, the charger 28 only needs to transmit DC power from the external power source 40 to the main battery 10. The mode of the external charging of the electrified vehicle 100 is not particularly limited.

Figure 3:
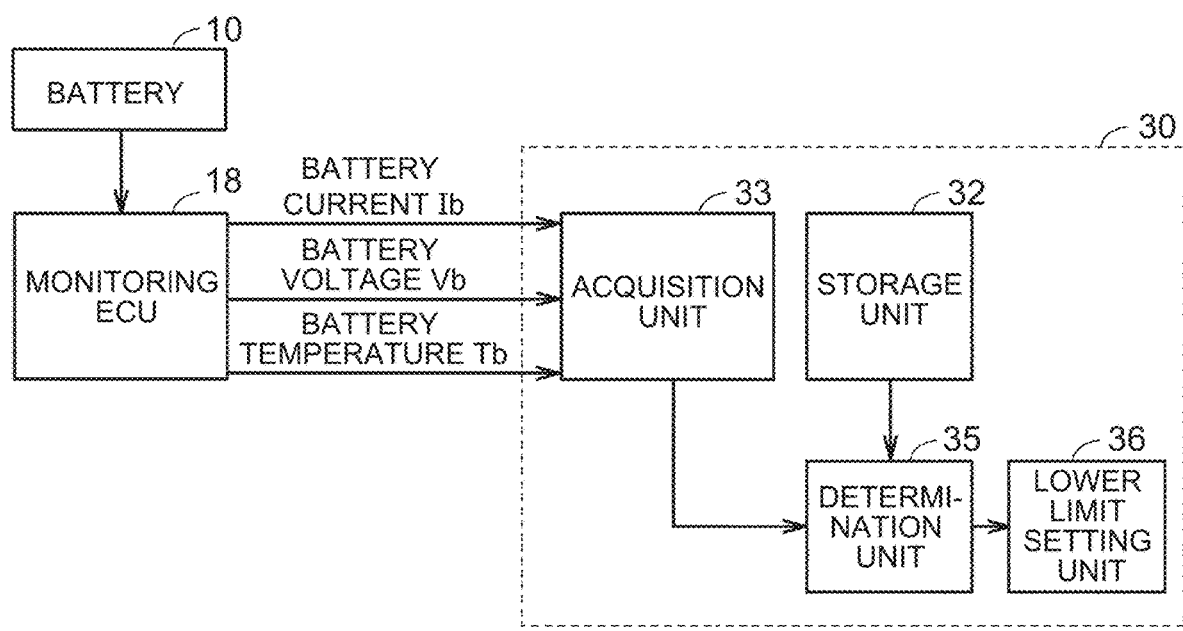
FIG. 3 is a diagram showing a functional block diagram of a controller shown in FIG. 1.

FIG. 3 is a diagram showing a functional block diagram of the controller 30 shown in FIG. 1. As shown in FIG. 3, the acquisition unit 33 acquires various information from the monitoring ECU 18. Specifically, the acquisition unit 33 acquires measurement data related to the main battery 10 such as the battery voltage Vb, the battery current Ib, the battery temperature Tb, and the SOC.

The acquisition unit 33 also acquires a first index value that is an index of the deterioration state of the main battery 10. In the present embodiment, a case where the first index value is the full charge capacity C of the main battery 10 will be described as an example. As a method for calculating the full charge capacity C, for example, a known method such as a current integration method can be used. In the current integration method, the product (electric power) of the battery voltage Vb and the battery current Ib is integrated over time.

Note that the full charge capacity C may be calculated by the monitoring ECU 18. Further, the full charge capacity C may be calculated by the controller 30 based on data such as the battery voltage Vb, the battery current Ib, and the battery temperature Tb input from the monitoring ECU 18. In this case, the controller 30 is provided with a calculation unit that calculates the full charge capacity C, and the acquisition unit 33 acquires the full charge capacity C from the calculation unit. As described above, when the controller 30 is provided with the SOC calculation function, the SOC may be calculated by the calculation unit.

The determination unit 35 determines whether the full charge capacity C acquired by the acquisition unit 33 indicates a predetermined degree of deterioration or more. Information about the degree of deterioration may be stored in the storage unit 32, and in this case, the information about the degree of deterioration is input from the storage unit 32 to the determination unit 35.

The lower limit setting unit 36 sets the lower limit value of the allowable range for a second index value indicating a power storage state of the main battery 10, based on the determination result of the determination unit 35. In the present embodiment, the above SOC is used as the second index value. In this case, the allowable range for the second index value corresponds to the SOC control range. The lower limit value of the SOC control range is set so as to have an upper margin with respect to the empty state of the SOC for control, which is provided for avoiding further progress of overdischarge.

FIG. 4 is a diagram showing a flowchart showing a control flow for setting the lower limit value by the lower limit setting unit shown in FIG. 1. A control flow for setting the lower limit value will be described with reference to FIG. 4. Each step shown in this flow may be repeatedly executed by the controller 30 at predetermined intervals or at predetermined timings.

As shown in FIG. 4, when setting the lower limit value, first, in step S1, the acquisition unit 33 acquires the full charge capacity C as the first index value that is an index of the deterioration state of the main battery 10. Specifically, as described above, the acquisition unit 33 acquires the full charge capacity CC calculated by the monitoring ECU 18. When the controller 30 is provided with a calculation unit for calculating the full charge capacity C, the full charge capacity C calculated by the calculation unit is acquired.

Subsequently, in step S2, the determination unit 35 determines whether the full charge capacity C indicates a predetermined degree of deterioration or more. The determination unit 35 uses the full charge capacity C acquired by the acquisition unit 33 and the information about the degree of deterioration stored in the storage unit 32 to determine whether the full charge capacity C indicates a predetermined degree of deterioration or more.

For example, as will be described later, the determination unit 35 determines that the full charge capacity C indicates a predetermined degree of deterioration or more, for example, when the full charge capacity C has changed from 100% to 80%, when the full charge capacity C has changed from 80% to 60%, or when the full charge capacity C has changed from 40% to 60%.

In the present embodiment, a case in which the determination unit 35 has the determination function as described above will be described as an example, but the determination function of the determination unit 35 may be provided in the lower limit setting unit 36.

When it is determined in step S2 that the full charge capacity C indicates a predetermined degree of deterioration or more (step S2: YES), step S3 is executed. On the other hand, when it is not determined in step S2 that the full charge capacity C indicates a predetermined degree of deterioration or more (step S2: NO), step S4 is executed.

In step S3, the lower limit setting unit 36 lowers the lower limit value of the SOC control range described above as the lower limit value of the allowable range for the second index value indicating the power storage state of the main battery 10.

FIG. 5 is a diagram showing an example of the relationship between the full charge capacity and the lower limit value of the SOC control range in the control flow shown in FIG. 4.

As shown in FIG. 5, the storage unit 32 stores a table used for setting the lower limit value. In this table, the full charge capacity C and the lower limit value of the SOC control range are associated with each other.

For example, when the full charge capacity C is 100%, the lower limit value is set to 40%, and when the full charge capacity C is 80%, the lower limit value is set to 30%. Further, when the full charge capacity C is 60%, the lower limit value is set to 20%, and when the full charge capacity C is 40%, the lower limit value is set to 10%.

When setting the lower limit value, the above table does not necessarily need to be used, and a MAP created in advance and indicating the relationship between the full charge capacity C and the lower limit value of the SOC control range may be used, or the following calculation formula may be used: the amount of reduction in the lower limit value of the SOC control range=capacity decrease rate of SOC×predetermined value. When using the calculation formula, the amount of reduction in the calculated lower limit value is subtracted from the previously set lower limit value to set a new lower limit value. When step S3 ends, the entire process is returned to the main routine.

In step S4, the current lower limit value of the SOC control range is maintained. When step S4 ends, the entire process is returned to the main routine. As a result, the lower limit value can be maintained until the full charge capacity C indicates a predetermined degree of deterioration or more, so that the lower limit value can be easily managed.

FIG. 6 is a diagram illustrating control of the lower limit value of the SOC control range based on the degree of deterioration of the main battery according to the embodiment.

As shown in FIG. 6, by executing the above control flow, for example, in the first stage when the main battery 10 is hardly deteriorated, the lower limit value of the SOC control range is set to Smin1 with respect to the full charge capacity C1.

When the degree of deterioration of the main battery 10 progresses to the second stage, the full charge capacity C becomes C2, which is smaller than the full charge capacity C1 of the first stage. Accordingly, it is determined that the full charge capacity C has indicated a predetermined degree of deterioration or more. In this case, the lower limit setting unit 36 sets the SOC control range from Smin1 to Smin2. Smin2 is a value smaller than Smin1.

When the degree of deterioration of the main battery 10 further progresses to the third stage, the full charge capacity C becomes C3, which is smaller than the full charge capacity C2 of the second stage. Accordingly, it is determined that the full charge capacity C has indicated a predetermined degree of deterioration or more. In this case, the lower limit setting unit 36 sets the SOC control range from Smin2 to Smin3. Smin3 is a value smaller than Smin2.

When the degree of deterioration of the main battery 10 progresses to the fourth stage, the full charge capacity C becomes C4, which is smaller than the full charge capacity C3 of the third stage. Accordingly, it is determined that the full charge capacity C has indicated a predetermined degree of deterioration or more. In this case, the lower limit setting unit 36 sets the SOC control range from Smin3 to Smin4. Smin4 is a value smaller than Smin3.

In this way, the lower limit setting unit 36 sets the lower limit value to a lower value as the degree of deterioration of the main battery 10 increases (the degree of deterioration progresses). As a result, the capacity that can be used by the main battery 10 can be increased at each stage.

Figure 7:
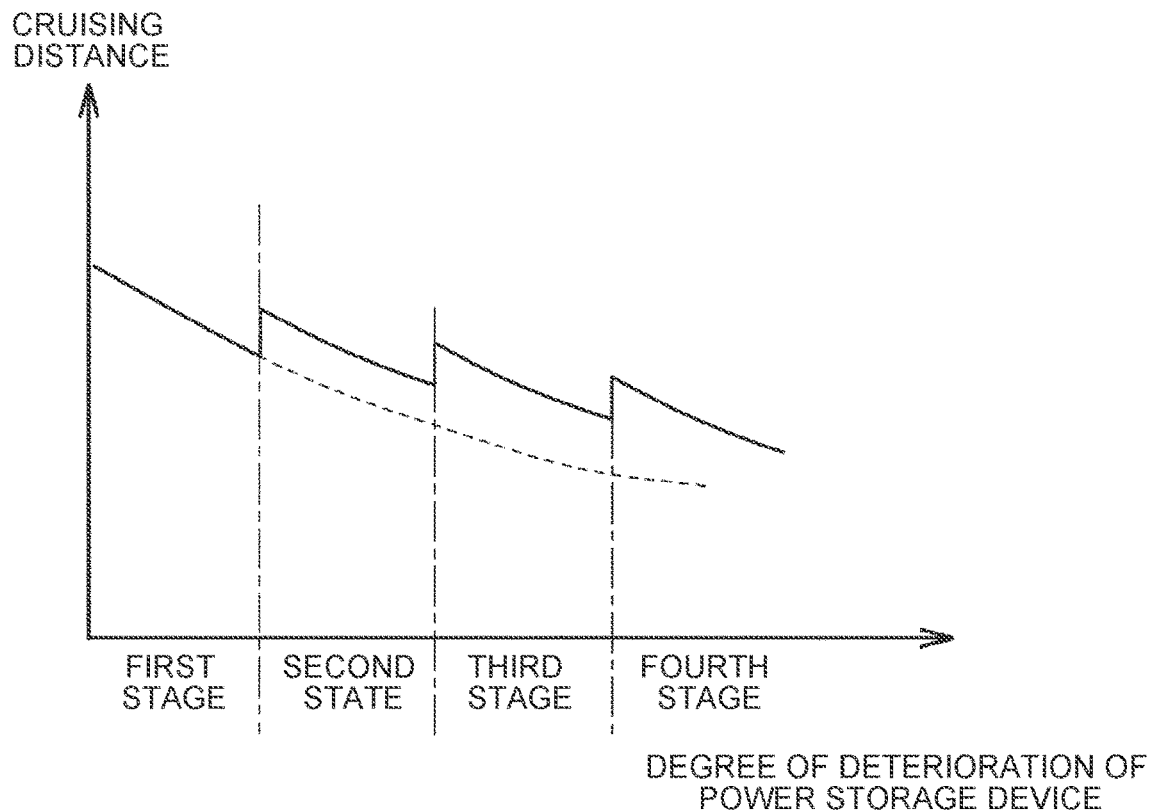
FIG. 7 is a diagram illustrating a cruising distance that can be achieved by control according to the embodiment.

FIG. 7 is a diagram illustrating a cruising distance that can be achieved by control according to the embodiment. In FIG. 7, the dashed line indicates the cruising distance when the lower limit value is not changed even when the main battery 10 is deteriorated, and the solid line indicates the cruising distance when the control device controls the lower limit value according to the present embodiment.

As shown in FIG. 7, when the lower limit value is not lowered and is fixed at Smin1, the full charge capacity of the main battery 10 decreases as the deterioration of the main battery 10 progresses, so the cruising distance also decreases.

On the other hand, when the lower limit value is lowered when the full charge capacity indicates a predetermined degree of deterioration or more, the capacity that can be used by the main battery 10 can be increased every time the full charge capacity indicates a predetermined degree of deterioration or more, that is, at each stage. As a result, even when the power storage device has a flat region in which the change rate of the open circuit voltage with respect to the storage amount is equal to or less than a predetermined value and it is difficult to raise the upper limit value of the allowable range, a sufficient cruising distance can be ensured.

In the above description, a configuration in which an LFP battery is used as the storage cell and the main battery 10 has a flat region in which the change rate of the OCV with respect to the SOC is smaller than that of adjacent regions has been described as an example. However, the present disclosure can also be applied to a main battery according to a first modification and a second modification having the following characteristics.

First Modification

Figure 8:
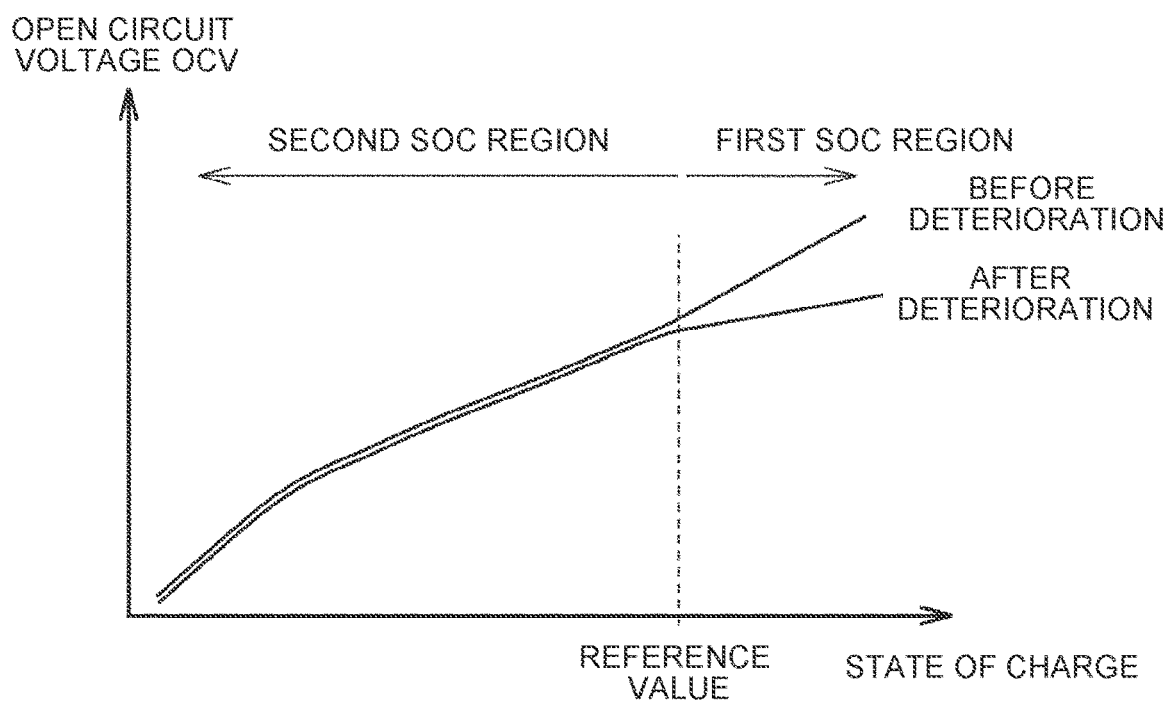
FIG. 8 is a diagram showing SOC-OCV characteristics before and after deterioration of a main battery according to a first modification.

FIG. 8 is a diagram showing SOC-OCV characteristics before and after deterioration of the main battery according to the first modification. The main battery according to the first modification will be described with reference to FIG. 8.

As shown in FIG. 8, the main battery according to the first modification has an SOC-OCV characteristic curve including a first SOC region in which the SOC is equal to or higher than a predetermined reference value and a second SOC region in which the SOC is less than the reference value. Note that the storage cell according to the first modification is, for example, a secondary battery different from the LFP battery. The reference value may be, for example, an SOC value near full charge.

The SOC-OCV characteristic curve after deterioration of the main battery is different from the SOC-OCV characteristic curve before deterioration of the main battery. Specifically, for example, the SOC-OCV characteristic curve of the main battery before deterioration, in which the first index value does not indicate a predetermined degree of deterioration or more, is different from that of the main battery after deterioration, in which the first index value indicates a predetermined degree of deterioration or more. In this case, the amount of change in the OCV of the main battery before and after deterioration in the first SOC region is greater than the amount of change in the OCV of the main battery before and after deterioration in the second SOC region.

When the main battery has such an SOC-OCV characteristic curve, the voltage may not be stable in the first SOC region, making it difficult to measure the OCV correctly. Therefore, when the main battery deteriorates, using the second SOC region side that exhibits stable behavior before and after deterioration, the lower limit setting unit 36 lowers the lower limit value of the SOC control range located in the second SOC region. As a result, the capacity that can be used by the main battery 10 can be increased, and a sufficient cruising distance can be ensured.

Figure 9:
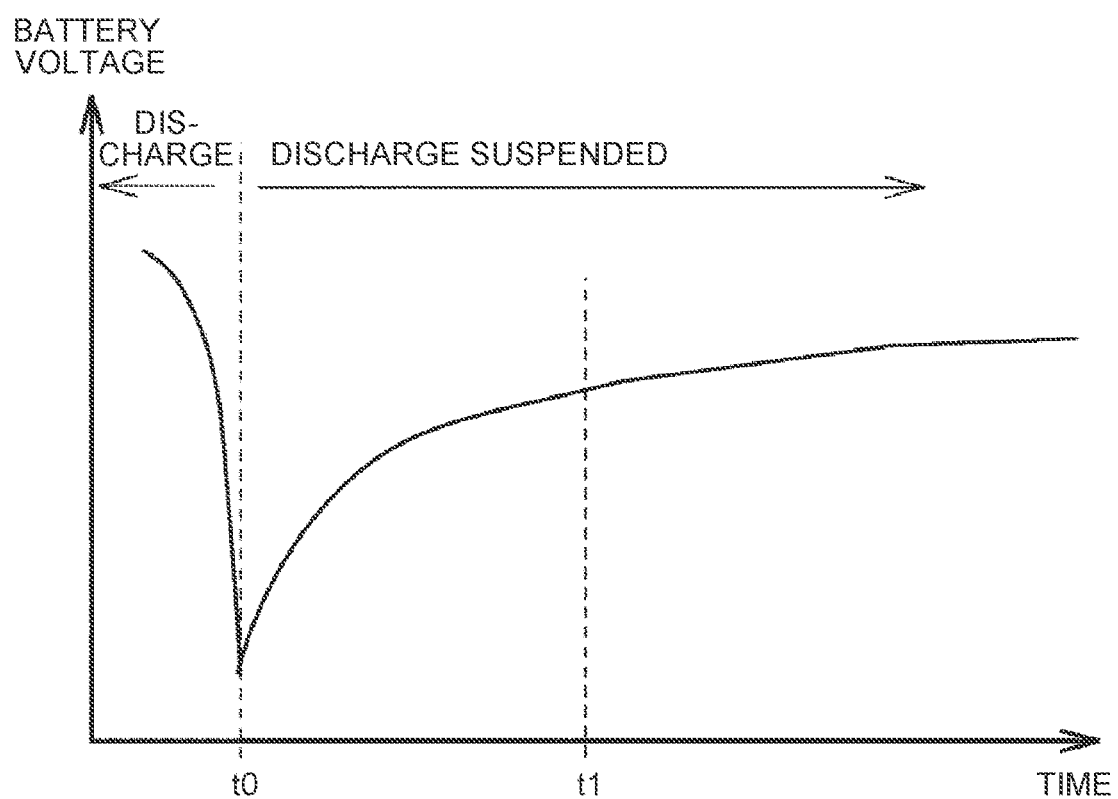
FIG. 9 is a diagram showing voltage changes during discharging and after stopping discharging in a main battery according to a second modification.

FIG. 9 is a diagram showing voltage changes during discharging and after stopping discharging in the main battery according to the second modification. The main battery according to the second modification will be described with reference to FIG. 9.

The main battery according to the second modification also has an SOC-OCV characteristic curve including a first SOC region in which the SOC is equal to or higher than a predetermined reference value and a second SOC region in which the SOC is less than the reference value. Note that the storage cell according to the second modification is, for example, a secondary battery different from the LFP battery. The reference value may be, for example, an SOC value near full charge.

As shown in FIG. 9, in the second modification, after the main battery is charged so that the SOC becomes equal to or higher than the reference value and discharge is performed, until a predetermined time (t1–t0) elapses from the timing when the discharge is suspended, the voltage of the main battery does not recover to the voltage at the start of discharge, and the polarization is not resolved. Note that the predetermined time is about two to three hours.

As described above, in the first SOC region side, if the voltage does not return to the voltage at the start of discharge until the predetermined time elapses from the suspension of the discharge, it may be difficult to measure the OCV correctly. Therefore, when the main battery deteriorates, using the second SOC region side where the polarization is resolved in the predetermined time, the lower limit setting unit 36 lowers the lower limit value of the SOC control range located in the second SOC region. As a result, the capacity that can be used by the main battery 10 can be increased, and a sufficient cruising distance can be ensured.

OTHER MODIFICATIONS

In the embodiment and the first and second modifications described above, a case where the first index value, which is an index of the state of deterioration of the main battery 10, is the full charge capacity C has been described as an example. However, the present disclosure is not limited to this, and the first index value may be values such as the total travel distance of the vehicle, the total travel time of the vehicle, the total amount of electric power supplied to the main battery 10, the temperature frequency of the main battery 10, and the resistance value of the main battery 10. By setting the lower limit value in the same manner as described above when these index values indicate a predetermined degree of deterioration or more, substantially the same effect as in the embodiment can be obtained.

Further, in the above-described embodiment, a case where the second index value indicating the power storage state of the main battery 10 is the SOC of the main battery 10 has been described as an example. However, the present disclosure is not limited to this, and the second index value may be the voltage of the main battery 10.

Further, in the above-described embodiment, a case where the lower limit value of the control range for the second index value is lowered in step S3 has been described as an example. However, when using the discharge amount as the second index value, the upper limit value of the discharge amount may be increased. In this case, instead of the lower limit setting unit 36, the controller 30 is provided with a setting unit for setting the upper limit value of the discharge amount, and the setting unit increases the upper limit value of the discharge amount when the first index value indicates a predetermined degree of deterioration or more.

The embodiments disclosed herein are illustrative and not restrictive in all respects. The scope of the present disclosure is indicated by the appended claims and includes all changes within the meaning and range of equivalency of the claims.

What is claimed is:

1. A control device that controls a power storage device, the control device comprising:
    an acquisition unit that acquires a first index value that is an index of a deterioration state of the power storage device; and
    a lower limit setting unit that lowers a lower limit value of an allowable range for a second index value indicating a power storage state of the power storage device, when the first index value acquired by the acquisition unit indicates a predetermined degree of deterioration or more,
    wherein the power storage device has an SOC-OCV characteristic curve including a first SOC region in which SOC is equal to or higher than a predetermined reference value and a second SOC region in which the SOC is less than the reference value,
    wherein the SOC-OCV characteristic curve of the power storage device before deterioration in which the first index value does not indicate the predetermined degree of deterioration or more is different from the SOC-OCV characteristic curve of the power storage device after deterioration in which the first index value indicates the predetermined degree of deterioration or more, and
    wherein an amount of change in OCV of the power storage device before and after deterioration in the first SOC region is greater than the amount of change in the OCV before and after deterioration in the second SOC region.

2. The control device according to claim 1, wherein after the power storage device is charged such that the SOC becomes equal to or higher than the reference value and discharge is performed, until a predetermined time elapses from a timing at which discharge is suspended, a voltage of the power storage device does not return to the voltage at a start of discharge.

3. The control device according to claim 1, wherein the power storage device has an SOC-OCV characteristic including a flat region in which a change rate of an open circuit voltage with respect to a state of charge is equal to or less than a predetermined value.

4. The control device according to claim 1, wherein the lower limit setting unit maintains the lower limit value when the first index value does not indicate the predetermined degree of deterioration or more.

5. The control device according to claim 1, wherein the lower limit setting unit lowers the lower limit value as the degree of deterioration increases.

6. The control device according to claim 1, wherein the first index value is a full charge capacity of the power storage device.

7. The control device according to claim 1, wherein the second index value is a SOC of the power storage device or a voltage of the power storage device.

8. A control method for controlling a power storage device, the control method comprising:
- acquiring a first index value that is an index of a deterioration state of the power storage device; and
- lowering a lower limit value of an allowable range for a second index value indicating a power storage state of the power storage device, when the first index value indicates a predetermined degree of deterioration or more,
- wherein the power storage device has an SOC-OCV characteristic curve including a first SOC region in which SOC is equal to or higher than a predetermined reference value and a second SOC region in which the SOC is less than the reference value,
- wherein the SOC-OCV characteristic curve of the power storage device before deterioration in which the first index value does not indicate the predetermined degree of deterioration or more is different from the SOC-OCV characteristic curve of the power storage device after deterioration in which the first index value indicates the predetermined degree of deterioration or more, and
- wherein an amount of change in OCV of the power storage device before and after deterioration in the first SOC region is greater than the amount of change in the OCV before and after deterioration in the second SOC region.

9. The control method according to claim 8, further comprising maintaining the lower limit value when the first index value does not indicate the predetermined degree of deterioration or more.

10. A control device that controls a power storage device, the control device comprising:
- an acquisition unit that acquires a first index value that is an index of a deterioration state of the power storage device; and
- a lower limit setting unit that lowers a lower limit value of an allowable range for a second index value indicating a power storage state of the power storage device, when the first index value acquired by the acquisition unit indicates a predetermined degree of deterioration or more,
- wherein the power storage device has an SOC-OCV characteristic curve including a first SOC region in which SOC is equal to or higher than a predetermined reference value and a second SOC region in which the SOC is less than the reference value, and
- wherein after the power storage device is charged such that the SOC becomes equal to or higher than the reference value and discharge is performed, until a predetermined time elapses from a timing at which discharge is suspended, a voltage of the power storage device does not return to the voltage at a start of discharge.

* * * * *